US008937908B2

(12) United States Patent
Damola et al.

(10) Patent No.: US 8,937,908 B2
(45) Date of Patent: Jan. 20, 2015

(54) METHOD AND APPARATUS FOR ENABLING DNS REDIRECTION IN MOBILE TELECOMMUNICATION SYSTEMS

(75) Inventors: Ayodele Damola, Solna (SE); Lars Westberg, Enkoping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 69 days.

(21) Appl. No.: 13/883,104

(22) PCT Filed: Nov. 8, 2010

(86) PCT No.: PCT/IB2010/055070
§ 371 (c)(1),
(2), (4) Date: Jul. 8, 2013

(87) PCT Pub. No.: WO2012/063100
PCT Pub. Date: May 18, 2012

(65) Prior Publication Data
US 2013/0279414 A1   Oct. 24, 2013

(51) Int. Cl.
*H04W 4/00*   (2009.01)
*H04L 29/12*   (2006.01)
*H04L 29/08*   (2006.01)

(52) U.S. Cl.
CPC .......... *H04L 61/20* (2013.01); *H04L 29/12066* (2013.01); *H04L 29/1282* (2013.01); *H04L 61/1511* (2013.01); *H04L 61/6013* (2013.01); *H04L 67/2814* (2013.01); *H04L 67/2842* (2013.01); *H04L 67/1014* (2013.01)
USPC .......................................................... 370/328

(58) Field of Classification Search
USPC ................................................. 370/310–349
See application file for complete search history.

(56) References Cited

U.S. PATENT DOCUMENTS

| 2002/0009079 | A1 | 1/2002 | Jungck et al. |
| 2007/0124487 | A1* | 5/2007 | Yoshimoto et al. ........... 709/230 |
| 2009/0055929 | A1* | 2/2009 | Lee et al. ........................ 726/23 |

FOREIGN PATENT DOCUMENTS

WO     2010/106390 A1    9/2010

OTHER PUBLICATIONS

International Search Report issued in corresponding International application No. PCT/IB2010/055070, mailing date Jul. 22, 2011.
Anonymous, "Global Server Load Balancing," URL: http://www.brocade.com/support/ProductManuals/ServerIron_ADXGlobalServer_LoadBalancingGuide/gslb.pdf., Jun. 15, 2009, pp. 1-166, XP55002536.

* cited by examiner

*Primary Examiner* — Kwang B Yao
*Assistant Examiner* — Juvena Loo
(74) *Attorney, Agent, or Firm* — Patent Portfolio Builders PLLC

(57) ABSTRACT

Method and radio network controller of a mobile telecommunication network for providing DNS redirection in a mobile telecommunication network. The radio network controller includes an interface configured to receive a DNS query from a mobile terminal and a domain name system, DNS, interceptor module. The DNS interceptor module is configured to intercept the DNS query from the mobile terminal, detect the indication of the content originator server or the content delivery provider, check the indication against a list of domain names handled by the radio network controller, and generate a DNS reply in response to the DNS query, the DNS reply including an IP address of a content server associated with the radio network controller and not including an IP address of the content delivery provider. The interface is configured to send the DNS reply to the mobile terminal.

26 Claims, 12 Drawing Sheets

METHOD AND APPARATUS FOR ENABLING DNS REDIRECTION IN MOBILE TELECOMMUNICATION SYSTEMS

TECHNICAL FIELD

The present invention generally relates to systems, software and methods and, more particularly, to mechanisms and techniques for enabling domain name server (DNS) redirection in a mobile telecommunication system.

BACKGROUND

During the past years, the evolution of various portable devices, e.g., mobile phones, personal digital assistants, etc. was driven by the idea of adding "smart" features. The smart features include, among other things, the capability to browse the Internet while on the move. For directing the end user requests to the best server for fetching the desired content, the Internet based content delivery network (CDN) companies, e.g., Akamai, use DNS redirection. The best location of the server may be expressed based on various parameters, e.g., closest topological proximity, shortest time to live (RTT), least load of the server, etc.

While the DNS redirection works well in the public Internet, there are some challenges in ensuring DNS redirection operation in mobile telecommunication networks, e.g., third generation (3G) or Long Term Evolution (LTE) networks. These mobile telecommunication networks are built in such a way that an identity of a mobile phone (e.g., Internet protocol (IP) address) may not be visible from outside the network. Thus, a CDN company cannot provide the best server for the mobile phone as the CDN company cannot "see" the internal structure of the mobile network. As the mobile telecommunication networks have their own content servers (caches) which may be used in response to the requests of the mobile phones and because the CDN companies do not see these servers, little use is currently made of these content servers by CDN companies.

A brief discussion about the DNS is believed to be in order here for a better understanding of the exemplary embodiments. Domain name service is a know Internet service which is used to resolve fully qualified domain names (FQDNs) to IP addresses (this is defined in RFC 1034 and RFC 1035, see http://www.ietf.org, the entire contents of which are incorporated herein by reference). A format of a traditional DNS query message 10 is shown in FIG. 1 and it includes a header field 12, a question field 14, an answer field 16, an authority field 18, and an additional field 20. The question field 14 of the header 10 includes a QNAME field 22 as shown in FIG. 2. The QNAME field may carry the name of the resource which is to be resolved.

DNS redirection is used in the Internet to facilitate selection of cache servers based on DNS resolution mechanisms. Various CDN companies use these techniques extensively. For example, such companies (e.g., Akamai) require their customers to modify their web pages to explicitly write in their universal resource locator (URL) a domain name pointing to Akamai servers. A special tool may be used for this conversion. For example, Akamai have used to "akamize" the URLs of its customers with such a tool. However, this particular company uses today a technique (CNAMing) whereby the customers delegate ownership of their domain name to Akamai.

For example, CNAMing involves configuring the DNS of client xyz so that a request for www.xyz.com corresponds to CNAME www.xyz.com.edgesuite.net. for the given client.

The content originator (e.g., xyz.com) references objects in its web pages using standard convention, for example, <img alt="Building on the past" src="/res/the company/images/2009/091110_history_180x90.jpg"/>. The content of xyz is either pulled or pushed into the Akamai caches so that both xyz and Akamai have control over load distribution. In the following, the term "content originator" refers to those companies or web sites that create (originate) the content and the term "content delivery provider" refers to those services that distribute (provide) the existing content to the users (e.g., Akamai).

The CNAMing DNS resolution flow is illustrated in FIG. 3. FIG. 3 shows that a user device 30 uses a browser to request a web page with an embedded image from xyz. The user device 30 sends to a local DNS 32, in step A1, a DNS query for a desired content (e.g., xyz.com). The local DNS 32 transmits the query in step A2 to a DNS 36 of the xyz web server 38. It is noted that the local DNS 32 is part of the communication network to which the user device 30 belongs to. The local DNS is sometimes called ISP DNS and it is provided inside the operator's network (fixed or mobile) and it is responsible for name resolution of domain names of the operator. The IP address of the local DNS server is provisioned in all the user devices that connect to the operator's network (e.g., via dynamic host configuration protocol (DHCP)), i.e., the user devices are aware of its existence. On the contrary, a root DNS 34 is a general server, e.g., this is a public DNS server of the Internet and it is located in the public Internet.

In step A3, the xyz DNS 36 returns an URL associated with the CDN delivery provider 40 to the local DNS 32. The local DNS 32 sends in step A4 a DNS query to the CDN delivery provider 40 based on the received URL. After exchanging a few messages in steps A5 to A8 with the CDN delivery provider 40 (which may include one or more servers), the local DNS 32 receives in step A9 an IP address of a content server of the CDN delivery provider 40. The local DNS 32 sends in step A10 the received IP of the content server of the CDN delivery provider 40 having the desired content to the user device 30. Finally, in step A11, the user device 30 sends a request for the desired content to the CDN delivery provider 40 and receives in step A12 that content from the server 40.

As mentioned above, another method currently used by some CDN delivery providers (e.g., Akamai) is to modify the URLs of the content originator (e.g., xyz). Using again the example of Akamai and xyz (please note that other content delivery providers and content originators may be used), the URLs of xyz may be Akamaized in the following manner. The domain xyz.com may use a special tool to Akamaize all links in its web pages, i.e., the Akamai domain name is placed in all URLs. For example, a conventional URL pointing to a picture on the xyz web site is <img src=http://xyz.com/Ads/adinfo_top.gif . . . > and becomes <img src=http://a1010.g.akamai.net/cnwk.1d/Ads/adinfo_top.gif . . . > after being akamaized. The new URL includes now a reference to akamai.net.

The akamaized URL DNS resolution flow is illustrated in FIG. 4. FIG. 4 is similar to FIG. 3 and for this reason the similar steps of these two figures are not repeated here.

A common feature of the existing DNS based redirection systems is the reliance on the local DNS server identity as well as the IP address of the requesting client to select the closest cache that has the desired content and/or to improve the quality of experience (QoE). However, if the caches storing the desired content are deployed inside the telecommunication network, for example, below the Gateway GPRS support node GGSN (GGSN) in a 3GPP network (e.g., at the radio network control (RNC) level), the current mechanisms for cache selection will fail. One of the reasons for this is that the GGSN is the IP anchor point for all IP entities below itself.

Accordingly, it would be desirable to provide devices, systems and methods that avoid the afore-described problems and drawbacks.

SUMMARY

Assets as, for example, content are desired to be provided to the users from locations that are most suitable to the users. A suitable location may be a location that is closest to the user. In this way, receiving the content from a location closest to the user frees bandwidth in the network and/or reduces a time for receiving the asset.

According to one exemplary embodiment, there is a radio network controller of a mobile telecommunication network. The radio network controller includes an interface configured to receive a DNS query from a mobile terminal, wherein the DNS query includes an indication of a content originator server or a content delivery provider; a domain name system, DNS, interceptor module connected to the interface and configured to associate domain names with corresponding internet protocol, IP, addresses, the DNS interceptor module being configured to intercept the DNS query from the mobile terminal, detect the indication of the content originator server or the content delivery provider, check the indication against a list of domain names handled by the radio network controller, and generate a DNS reply in response to the DNS query, the DNS reply including an IP address of a content server associated with the radio network controller and not including an IP address of the content delivery provider; and the interface is configured to send the DNS reply to the mobile terminal.

According to another exemplary embodiment, there is a method for enabling domain name system, DNS, resolution in a mobile telecommunication network. The method includes receiving, at a radio network controller of the mobile telecommunication network, a DNS query from a mobile terminal; instead of forwarding the DNS query to a DNS server, intercepting the DNS query at a DNS interceptor module; analyzing the DNS query to detect an indication of a content originator server or an indication of a content delivery provider; checking the indication against a list of domain names handled by the DNS interceptor module; generating a DNS reply with an IP address of a content server associated with the radio network controller and not with an IP address of the content delivery provider outside the mobile telecommunication network; and sending the DNS reply to the mobile.

According to still another exemplary embodiment, there is a radio network controller in a mobile telecommunication network. The radio network controller includes an interface configured to receive a DNS query from a mobile terminal, wherein the DNS query includes an indication of a content originator server or a content delivery provider; a domain name system, DNS, interceptor function running on a processor and configured to associate domain names with corresponding internet protocol, IP, addresses, the DNS interceptor function being configured to intercept the DNS query from the mobile terminal, detect the indication of the content originator server or the content delivery provider, check the indication against a list of domain names handled by the radio network controller, and generate a DNS reply in response to the DNS query, the DNS reply including an IP address of a content server associated with the radio network controller and not including an IP address of the content delivery provider; and the interface is configured to send the DNS reply to the mobile terminal.

It is an object to overcome some of the deficiencies discussed in the previous section and to provide a node in a telecommunication network with the capability of discovering a suitable location of desired content for a mobile terminal. One or more of the independent claims advantageously provides a novel redirection procedure for providing the mobile terminal with the desired content from a server located inside the telecommunication network.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of DNS and RNC. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a module (RNC DNS module or DNS interceptor module) at an RNC level of a mobile telecommunication network for intercepting a DNS request (or query) that come from a mobile terminal and for generating a DNS reply to be sent back to the mobile terminal. This feature enables the RNC to provide an indication to the mobile terminal for obtaining a desired content from content servers located below the GGSN (e.g., collocated with the RNC). In one application, a functionality for running the CDN delivery provider's software in nodes below the GGSN is described in the following exemplary embodiments. Thus, in one exemplary embodiment the RNC DNS module replies to the DNS request instead of the root DNS or other DNS outside the telecommunication network.

Figure 5:
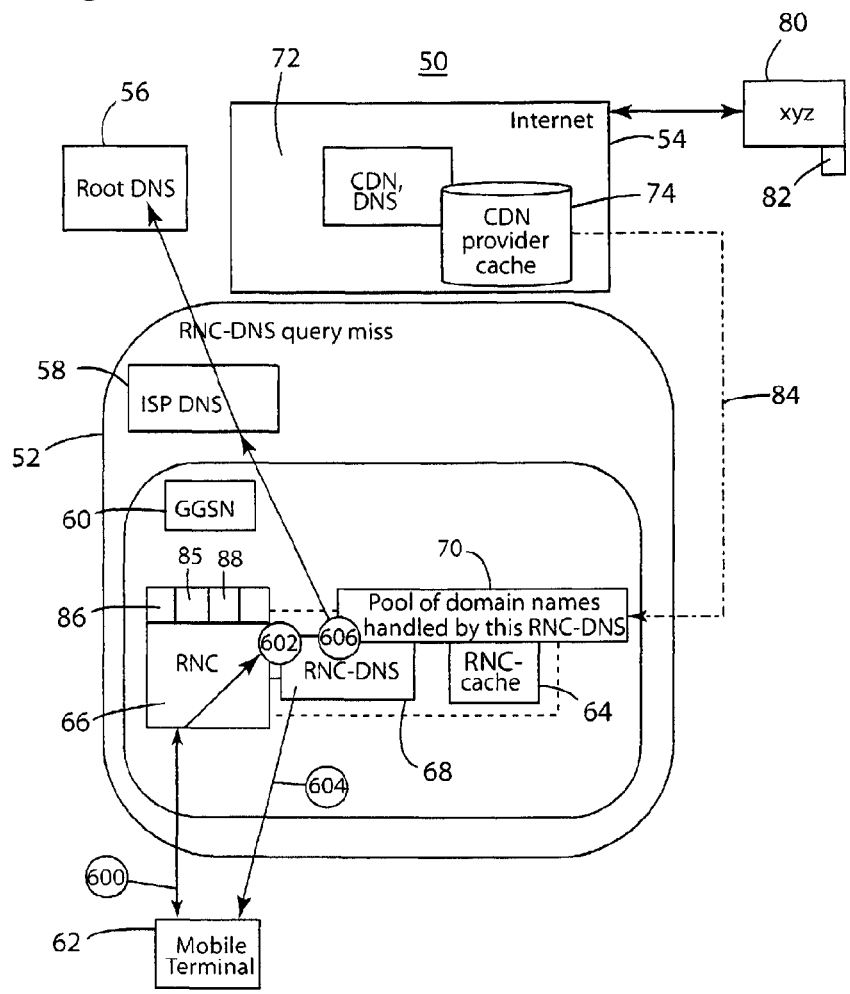
FIG. 5 is a schematic diagram of a system with a novel DNS redirecting mechanism according to an exemplary embodiment.

According to an exemplary embodiment illustrated in FIG. 5, a system 50 for providing the desired content to a mobile terminal includes a mobile telecommunication network 52, a CDN delivery provider 54 and a root DNS 56. The mobile telecommunication network 52 may be a 3$^{rd}$ Generation Partnership Project (3GPP) mobile network. The architecture of 3GPP mobile networks is built around tunneling since the IP level mobility solution is GPRS Tunneling Protocol (GTP), where GPRS is the General Packet Radio Service tunneling protocol. In this network, the client is given an IP address that does not change and is topologically anchored in a gateway node (the GGSN node), regardless of where the mobile terminal is actually located in the IP domain, e.g., regardless that the mobile terminal is active inside another network and served by a serving node. Other networks that do not use the 3GPP architecture may also use an IP address for a mobile terminal that is not indicative of the real geographical location of the client device. The novel exemplary embodiments to be discussed are applicable to these other networks.

The root DNS 56, as earlier discussed, is a public DNS server that is provided in the public Internet domain. The mobile telecommunication network 52 includes a local DNS server 58 (also called ISP DNS server) and a GGSN node 60. A GGSN node is described in more details in International Patent Application PCT/IB2009/005045, entitled "Optimized Redirection Network Architectures" and assigned to the same assignee as the present application, the entire content of which is incorporated herein by reference.

A mobile terminal 62 is connected to the network 52 and may have the capability to search/browse the Internet for the desired content. The mobile terminal 62 has been assigned an IP address by the GGSN node 60, which IP address is topologically anchored at the GGSN node 60. Hence, to other networks and/or computers on the Internet (e.g., the CDN delivery provider 54), the mobile terminal 62 appears to be located at the GGSN node 60 even when the mobile terminal roams in another network. If the CDN delivery provider 54 sends a message (including a web page) addressed to the IP address of the mobile terminal 62, the message is routed by Internet routers to the GGSN node 60. If a content server 64 containing the desired information is placed at the RNC 66 level, the existing mechanisms of the CDN delivery provider 54 fail to "see" the content server 64 as the inside topology of the mobile network 52 is not available for outside parties.

Thus, according to an exemplary embodiment, an RNC DNS interceptor function is implemented at the RNC 66, e.g., in an RNC DNS module or DNS interceptor module 68. The DNS interceptor module 68 may be a full DNS server or may include only selected functionalities of the DNS server. In addition, the DNS interceptor module 68 may include supplementary functionality, e.g., message interception, filtering, parsing, etc. The DNS interceptor function may be implemented in software, in dedicated circuitry, in a processor, or a combination thereof. Before discussing how the DNS interceptor module 68 works in the context of the RNC 66, the organization of the CDN delivery provider 54 is briefly discussed next.

The CDN delivery provider 54 may include a CDN DNS server 72, and one or more CDN delivery provider caches 74. The CDN delivery provider caches 74 may be distributed at various geographical locations. The CDN delivery provider 54 has its own clients (content originators), an example of which may be xyz. A content originator 80 generates (originates) the content that the mobile terminal 62 is interested in. The CDN delivery provider 54 (e.g., Akamai) is configured to communicate with the content originator 80 and to store the content generated by the content originator 80 on its own servers 74.

However, as already discussed above, the servers 74 may not be the closest servers to the mobile terminal 62. In this respect, the RNC content server 64 may be the closest cache to the mobile terminal 62. The RNC content server 64 may be part of the mobile network 52, may be part of the CDN delivery provider 54 or a combination of these possibilities. More than one RNC content server 64 may exist in the mobile network 52 as discussed later.

For the purpose of the following discussion, it is assumed that the content originators 80 have entered into a business relation with the CDN delivery provider 54 and the content from the content originator 80 is available on the RNC content server 64. Also, the content originators 80 have their own DNS server 82. Further, it is assumed that the mobile network operator does not want to expose the topology of its network to others, e.g., to CDN delivery provider 54, content originator 80, etc. Thus, these third parties cannot "see" the internal topology of the mobile network 52. Also, the CDN delivery provider 54 may be configured to directly update the content of the RNC content sever 64 via a communication path 84.

As part of the relationship between the CDN delivery provider 54 and the content originator 80, the CDN delivery provider 54 may assign an identifier to each content originator 80, for example, a number. The CDN delivery provider 54 may deploy servers or content associated with a customer across RNC content servers 64. The DNS interceptor module 68 includes a list 70 of domain names that are handled at the RNC level. The RNC 66 or the DNS interceptor module 68 may include a break-out module 85, a filter module 86 and a parser/modification module 88 as will be discussed later.

Figure 6:
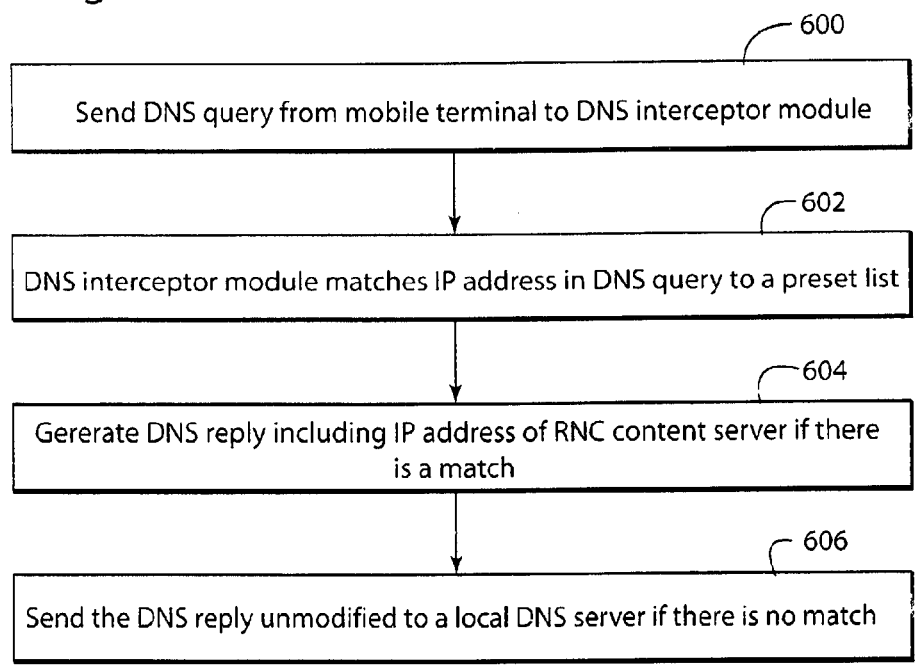
FIG. 6 is a flow chart of a method for DNS redirecting according to an exemplary embodiment.

A method for providing the desired content to the mobile terminal 62 from the RNC content server 64 instead of the CDN server 74 is now discussed with regard to FIGS. 5 and 6. As shown in FIG. 5, the mobile terminal 62 sends in step 600 (see also FIG. 6) a DNS query for an URL of the CDN delivery provider 54. The DNS interceptor module 68 receives the DNS query and checks in step 602 an URL (e.g., an indication of an IP address of the content delivery provider or the content originator server) from the DNS query against a pool of domain names (included in list 70) whose content is present (or may be downloaded) in the RNC content server 64. If there is a match between the required URL and URLs associated with the content stored by the RNC content server 64, the DNS interceptor module 68 generates a DNS reply in step 604 that includes an IP address associated with the RNC content server 64. Thus, the DNS interceptor module 68 does not allow the DNS query from the mobile terminal 62 to proceed to the local DNS 58 or other DNS server.

Figure 1:
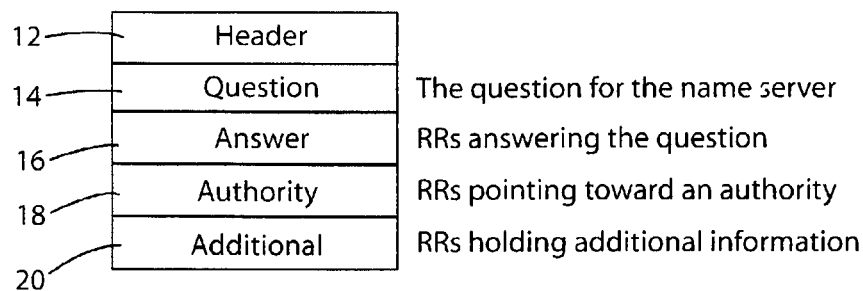
FIG. 1 is a schematic diagram of a DNS message.
Figure 2:
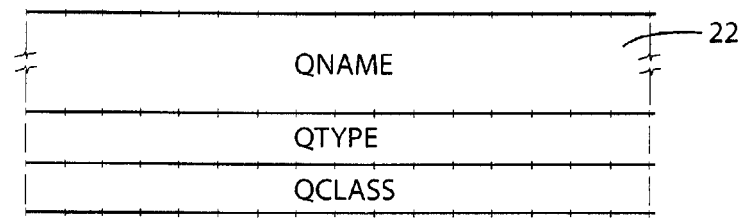
FIG. 2 is a schematic diagram of a field of a DNS message.
Figure 3:
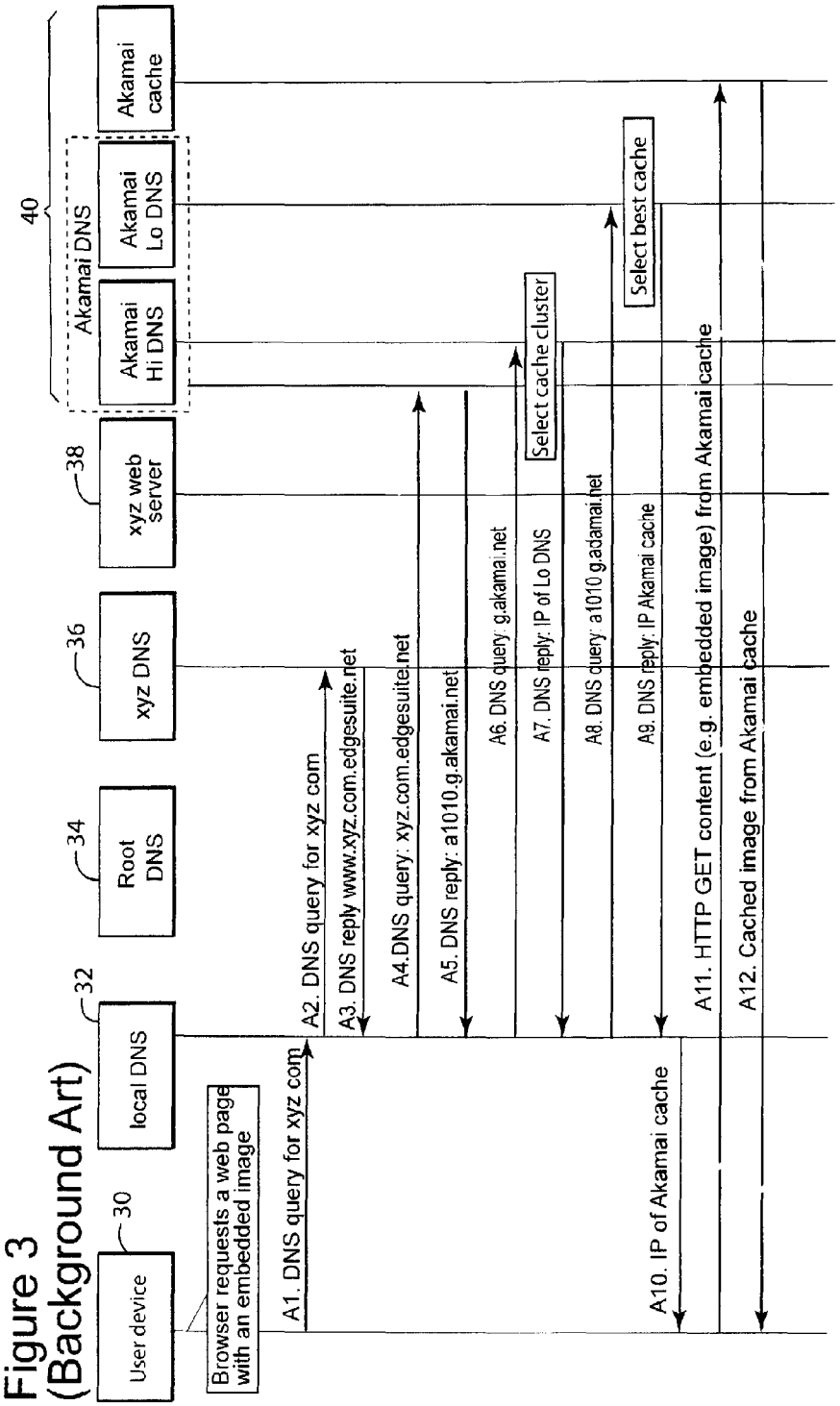
FIG. 3 is a flow chart of a method for DNS redirecting.

However, if in step 602 is determined by the DNS interceptor module 68 that the URL request of the mobile terminal does not match the URL associated with the content stored by the RNC content server 64, the DNS query from the mobile terminal 62 is allowed in step 606 to proceed via the normal resolution process to the local DNS 58. From here, the process for obtaining the desired content is similar to those illustrated in FIGS. 3 and 4.

Figure 7:
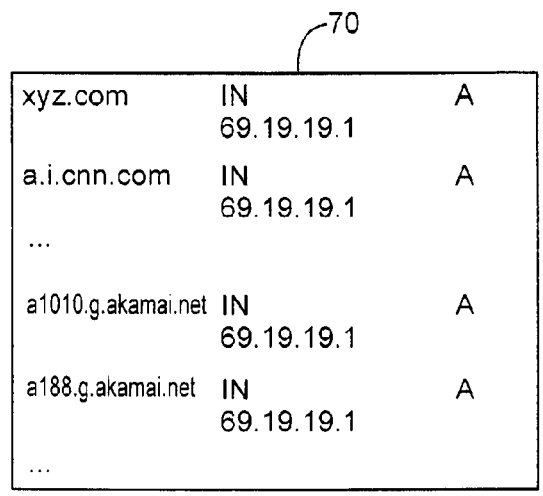
FIG. 7 is a schematic diagram of a list of mappings available in a DNS interceptor module according to an exemplary embodiment.

In an exemplary embodiment, the DNS interceptor module is periodically updated with a set of domain names (zones) for which it is responsible. The set of domain names may be stored in the list 70 in the DNS interceptor module. The set of domain names may be, as shown in FIG. 7, in the form of "A" records which all point to the IP address (e.g., 69.19.19.1) of the RNC content server 64 which is collocated with the DNS interceptor module 68. As shown in FIG. 7, the DNS interceptor module 68 may act in a similar way to a full fledge DNS server. The set of domain names that are mapped to the RNC content server 64 depends on the content delivered or to be delivered by the CDN delivery provider 54, via link 84, to the RNC content server 64. In other words, if the content of a domain name xyz.com is going to be available on the RNC content server 64, then entry "xyz.com" in list 70 is associated with the IP address 69.19.19.1 of RNC content server 64.

In one exemplary embodiment, the TLL of the DNS records are short so that the client (mobile terminal) is forced to discard them from its DNS cache and make a new request for every new URL. For example, the TLL may be less than 20 seconds.

Figure 8:
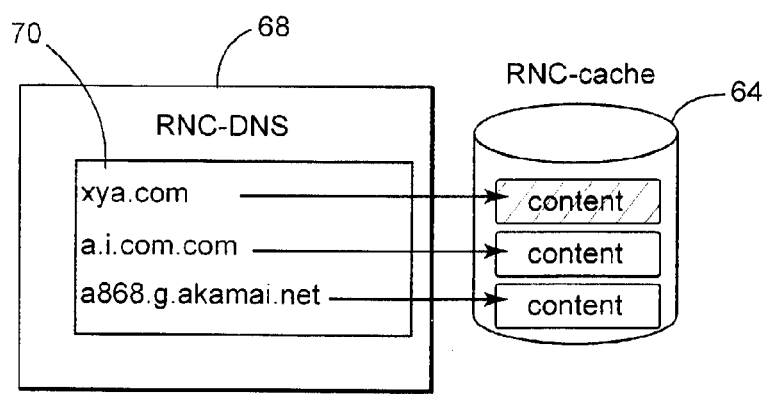
FIG. 8 is a schematic diagram of an association between domain names and content in a DNS interceptor module according to exemplary embodiments.

In one exemplary embodiment, a relationship between the domain name pool 70 of the DNS interceptor module 68 and the content in the RNC content server 64 is illustrated in FIG. 8.

The DNS interceptor module 68 may have a first function of intercepting the DNS query from the mobile terminal and a second function of extracting an IP address associated with the DNS query. The DNS interceptor module 68 may also be configured to substitute the IP address extracted from the DNS query with its own IP address (or another predetermined IP address). The predetermined IP address may point to the RNC content server 64. In other applications, these functions may be provided in corresponding modules that cooperate with each other. In still another exemplary embodiment, the modules may be distributed in the mobile network. However, all the functions may be provided in the same module, e.g., the DNS interceptor module 68.

Figure 9:
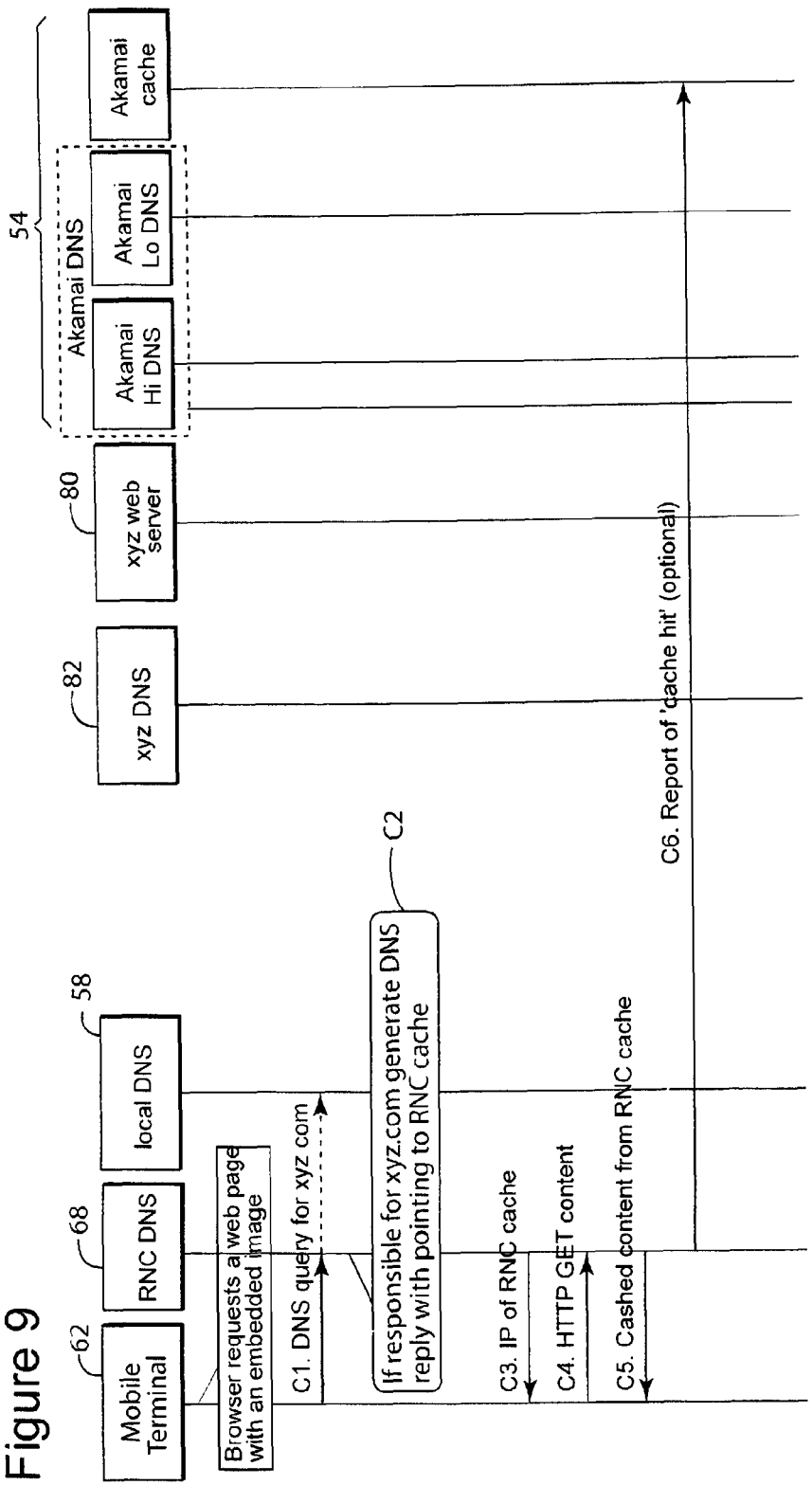
FIGS. 9 and 10 are signal charts of methods illustrating how a DNS query is used for the DNS redirecting according to an exemplary embodiment.

For illustrating how to implement the above described method in an existing system, the exemplary embodiment illustrated in FIG. 9 is discussed step by step. This implementation is not intended to be limiting the exemplary embodiments. For simplicity, the CDN delivery provider 54 is chosen to be Akamai and the content originator 80 is chosen to be xyz. However, it is noted that the novelty of the exemplary embodiments equally apply to other content delivery providers and content originators. The method illustrated in FIG. 9 assumes that the function CNAMing of Akamai was used to akamaize the xyz's web pages. It is also noted that FIG. 9 shows a break-out function, a filtering function, and a modifying function as being performed in the DNS interceptor module 68.

The user of the mobile terminal 62 is using a browser to request a web page. Thus, in step C1, the mobile terminal 62 makes a recursive DNS query for a domain name (xyz.com) to the local DNS server 58. The DNS interceptor module 68 intercepts in step C2 the DNS query and determines whether the RNC is responsible for content from xyz.com. If the determination is positive, the DNS interceptor module 68 generate a DNS reply with IP address pointing to RNC content server 64. The DNS reply is sent in step C3 to the mobile terminal 62. If the RNC is not responsible for the content of xyz.com, then a signaling scheme similar to that shown in FIG. 3 may be used to get the content from the CDN content delivery provider 54.

Step C2 may include a step of intercepting the DNS query, a step of extracting an IP address present in the DNS query that points to a content server desired by the mobile terminal, a step of matching the extracted IP address with IP addresses stored in the list 70, and a step of generating a DNS reply if there is a match. If the DNS reply is generated, an IP address of the RNC content server 64 is inserted into the generated DNS reply. The mobile terminal sends in step C4 a request for content to the DNS interceptor module 68 and receives in step C5 the desired content. Optionally, in step C6 the DNS interceptor module 68 informs the CDN delivery provider 54 about the mobile terminal 62 receiving the desired content from the RNC content server 64.

One advantage of the present embodiment is that content stored closer to the mobile terminal, in the mobile network 52, is provided to the mobile terminal instead of providing the content from a farther CDN content server 74. As discussed with regard to FIG. 5, the content is stored on the RNC content server 64 by the CDN delivery provider 54 either in advance of the query of the mobile terminal or when a first query about that content is received at the CDN delivery provider 54.

Figure 4:
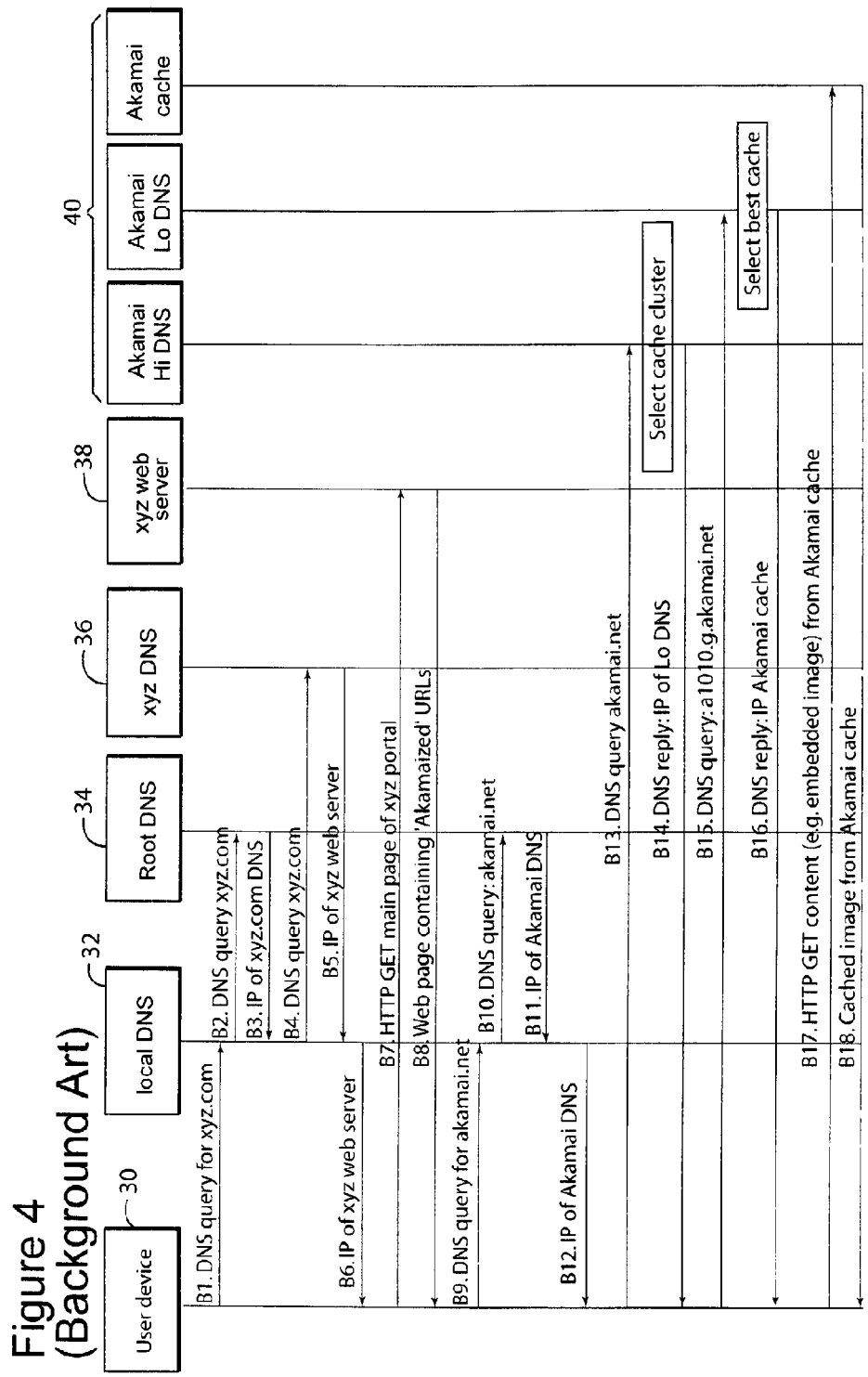
FIG. 4 is a flow chart of another method for DNS redirecting.
Figure 10:
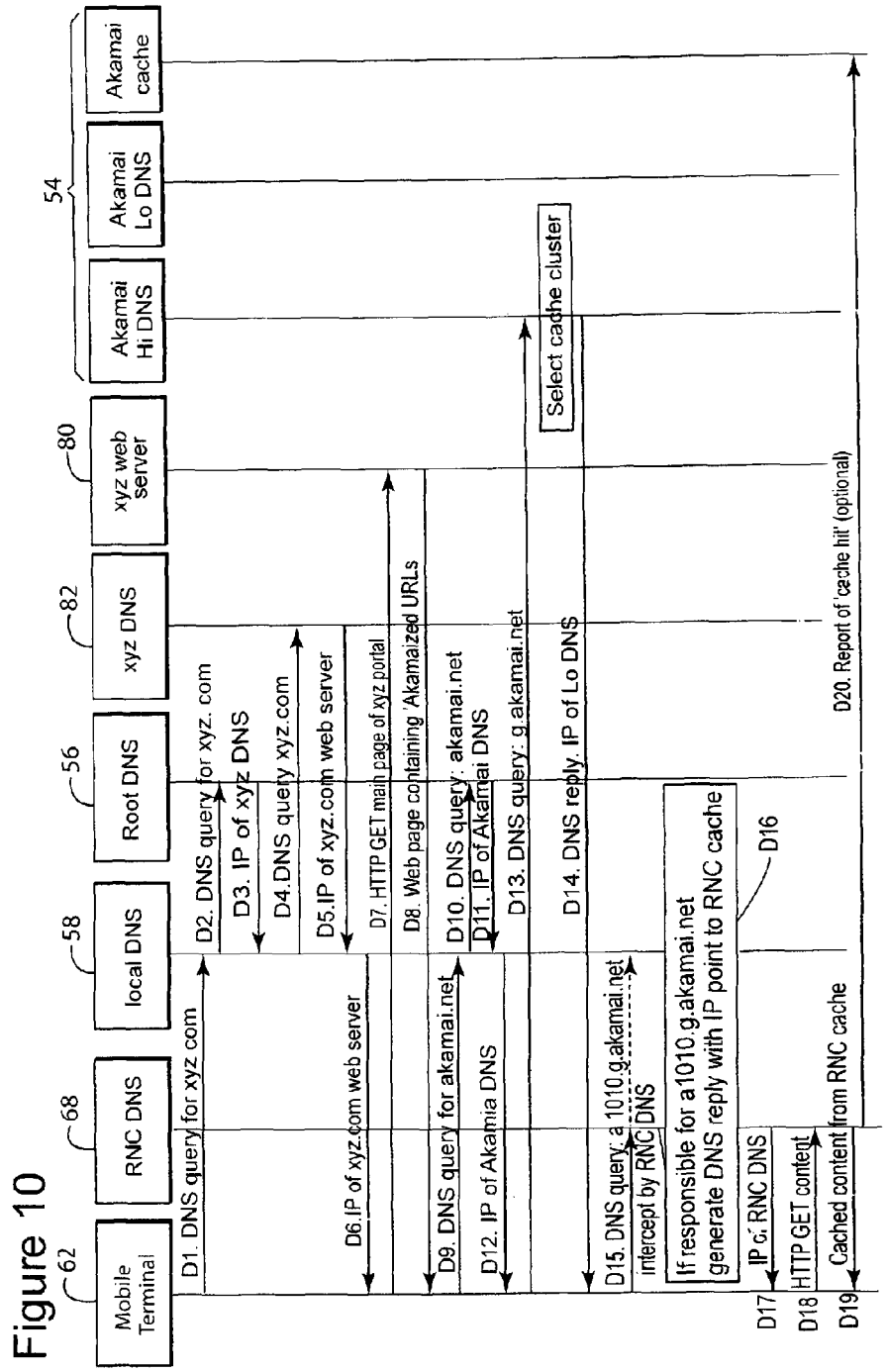

A different implementation is shown in FIG. 10 in which instead of using the CNAMing function, the URL of the content originator is akamaized as previously described with regard to FIG. 4. When the mobile terminal 62 sends the DNS query to the DNS interceptor module 68 in step D15, this step is interrupted by the DNS interceptor module 68 in step D16 similar to step C10 in FIG. 9. Then, steps D17-D20 are similar to steps C11-C14 in FIG. 9.

Both FIGS. 9 and 10 show the CDN delivery provider 54 as including High DNS and Low DNS servers. However, this structure of the CDN delivery provider 54 is specific for Akamai and different content delivery providers may have different structures. Thus, the structure shown in FIGS. 9 and 10 for the CDN delivery provider is not intended to limit the application of the exemplary embodiments.

The DNS interceptor module 68 and other modules that perform the steps of intercepting the DNS query from the mobile terminal and replacing an IP address with the IP address of the RNC content server 64 have been discussed above. A possible implementation of these modules or the logic of them is discussed next with regard to FIG. 11. As this implementation may be achieved by using hardware and/or software, the next exemplary embodiment is discussed in functional terms. Also, some functions discussed next are identified with reference numbers similar to those corresponding to the module likely to support these functions.

Figure 11:
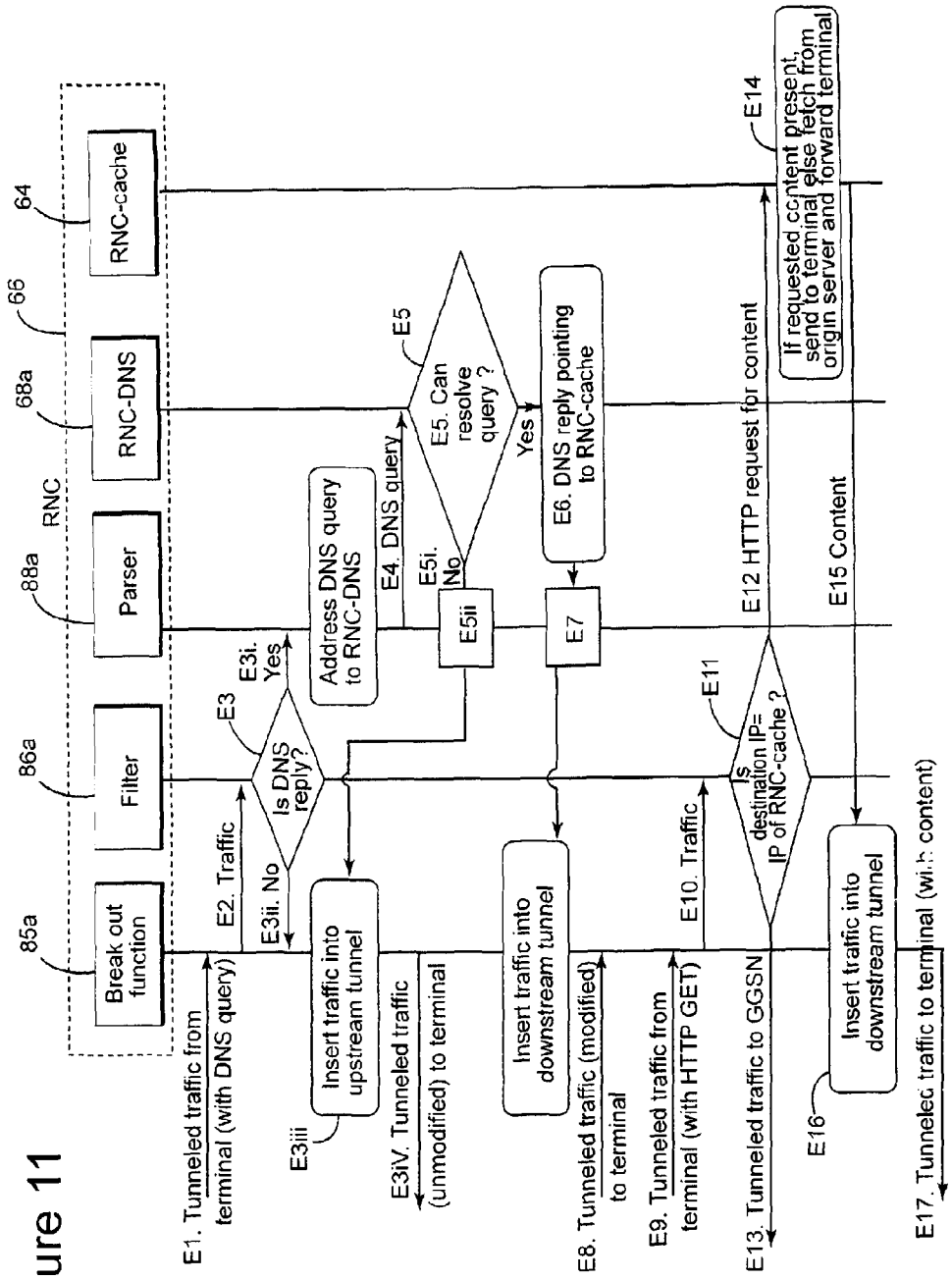
FIG. 11 is a schematic diagram of an RNC having multiple functions according to an exemplary embodiment.

In an exemplary embodiment illustrated in FIG. 11, traffic tunneled in step E1 from the GGSN 60 is broken-out at the RNC 66 by a break-out function 85*a* (this function may be implemented in the DNS interceptor module 68 or in a separate module, e.g., break-out function module 85). The break-out function 85*a* may be any available mechanism. The break-out function 85*a* decapsulates the traffic from the GGSN 60 and forwards it in step E2 to the filter function 86*a*. The filter function 86*a* may be implemented in the DNS interceptor module 68 or in the filter module 86. The filter function 86*a* verifies in step E3 whether the traffic is a DNS query or a DNS reply. In one application, the functions described herein apply only to the DNS query and not to a DNS reply. This step is performed, e.g., by checking whether the traffic destination user datagram protocol (UDP) port is 53 (default UPD port). If the traffic is a DNS query, then the message is forwarded in step E3*i* to a message modifier function 88*a*. This function 88*a* may be implemented in the DNS interceptor module 68 or other module of the RNC 66, e.g., the modifier module 88. If the traffic is not a DNS query and hence of no further interest, then the message is forwarded in step E3*ii* back to the break-out function 85*a*. The break-out function 85*a* inserts in step E3*iii* the unmodified traffic into the downstream tunnel and the traffic is sent on its normal path towards the GGSN 60 in step E3*iv*.

If the message is a DNS query, the DNS query is sent from the DNS message modifier function 88*a* to the DNS interceptor function 68*a* in step E4. This is possible as the modifier function 88*a* modifies the destination IP address of the DNS query. In step E5, the DNS interceptor function 68*a* tries to resolve the DNS query against its "A" records shown in FIG. 7. If the DNS query is not resolved, then in step E5*i* the modified DNS query is sent back to the modifier function 88*a* which changes in step E5*ii* the IP address to the original address. Then, the DNS query is returned to the break-out function 85*a* and it is inserted in step E3*iii* back into the tunnel to be sent to its original destination. If the DNS query was resolved in step E5, the DNS interceptor function 68*a* creates in step E6 a DNS reply pointing to the IP address of the RNC content server and the reply is forwarded in step E7 to the modifier function 88*a*. The modifier function 88*a* changes the source IP address of the DNS reply back to the IP address of the ISP DNS so that the mobile terminal believes that the DNS reply is coming from the ISP DNS and not from the DNS interceptor function 68*a*. The traffic is then encapsulated into the tunnel by the break-out function 85*a* and the tunneled traffic is sent to the mobile terminal in step E8.

The mobile terminal attempts to fetch in step E9 the content of the URL based on the IP address received in step E8. The tunnel traffic with the HTTP GET command is intercepted by the break-out function 85*a* to decapsulate the traffic. The traffic is forwarded in step E10 to the filter function 86*a* which checks if the destination IP address of the traffic corresponds to the IP address of the RNC content server 64. If there is a match in step E11, the HTTP GET command is sent in step E12 to the RNC content server 64, or otherwise the command is sent in step E13 to GGSN 60. In step E14, if the requested content is present on the RNC content server 64, the content is sent in step E15 to the mobile terminal. If the requested content is not present, the RNC content server 64 may download the content from the content originator server 80 or the CDN delivery provider 54. In step E16 the requested (desired) content is inserted into the traffic by the break-out function 85*a* and then the tunneled traffic is sent to the mobile terminal in step E17.

Figure 12:
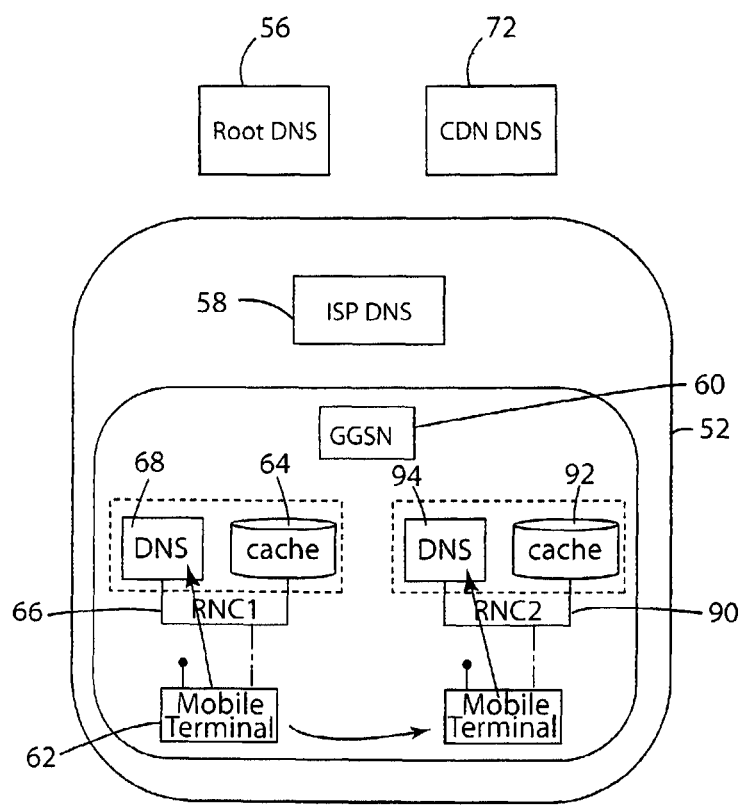
FIG. 12 is a schematic diagram of a mobile telecommunication network having plural RNCs and content servers according to an exemplary embodiment.

The exemplary embodiments discussed above also address the issue of mobility because when the mobile terminal moves to a new RNC, the parser module of the new RNC will intercept and insert its content server's IP address into the DNS reply and point the mobile terminal to fetch content from a corresponding RNC content server if the case. This is illustrated in FIG. 12 in which the new RNC 90 has its own content server 92 and modifier module 94.

Some of the advantages of the above exemplary embodiments are now discussed. One or more of the solutions discussed above enable vendors of 3G/4G equipment to interwork with the Internet CDN players (e.g., Akamai) and the mobile network operators for offering an improved service than that currently possible by impacting QoE, and attracting new customers. Some of the exemplary embodiments describe an inter-working solution between DNS based redirection solutions (e.g., Akamai) and 3GPP networks. For these exemplary embodiments, no changes are needed on either the content delivery provider or the 3GPP systems apart from the introduction of a new function or functions at the RNC level. These new functions may be implemented in software, in a new module to be added to the RNC or a combination of these possibilities.

Some of the exemplary embodiments offer an improved QoE that was not possible before as the caches can now be placed below the GGSN. Also, some of the exemplary embodiments accommodate terminal mobility, e.g., the RNC content server above the mobile terminal can be accessed at any given moment to provide the desired content. As the RNC content server is likely to be provided closer to the mobile terminal than the CDN delivery provider, a decrease in latency may be expected.

Figure 13:
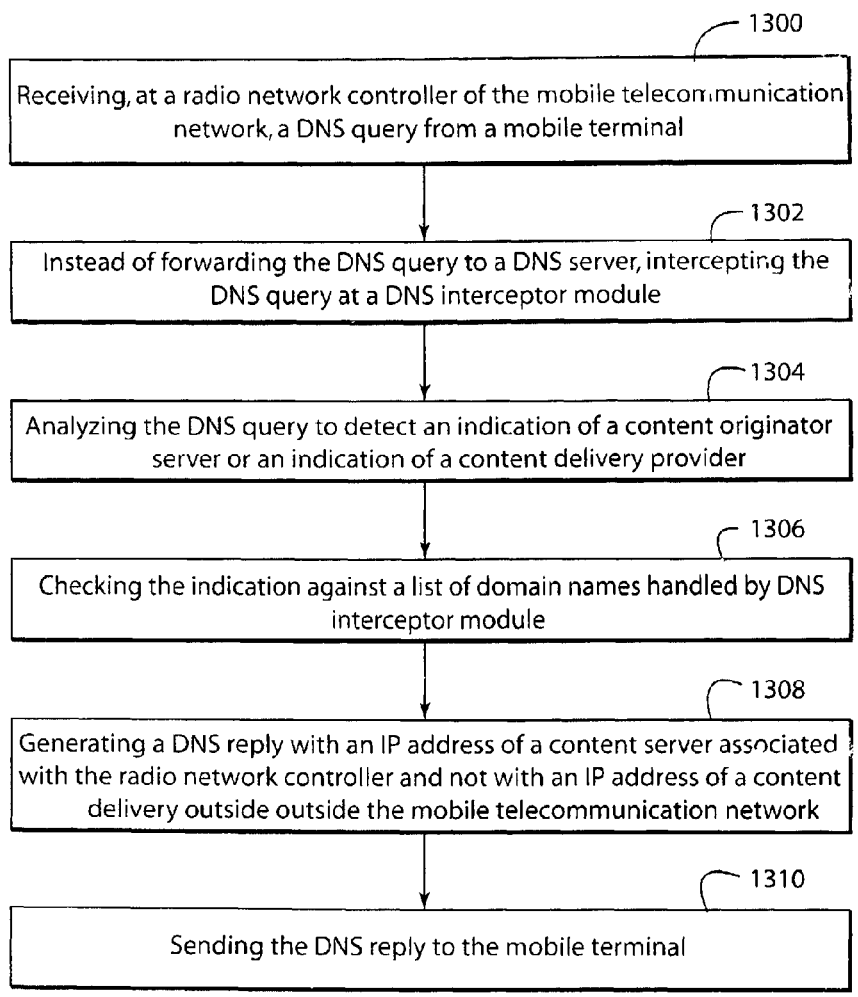
FIG. 13 is a flow chart of a method for DNS redirecting in a radio network controller according to an exemplary embodiment.

According to an exemplary embodiment illustrated in FIG. 13, there is a method for enabling DNS resolution in a mobile telecommunication network. The method includes a step 1300 of receiving, at a radio network controller (66) of the mobile telecommunication network (52), a DNS query from a mobile terminal (62); a step 1302 of intercepting the DNS query at a DNS interceptor module instead of forwarding the DNS query to a DNS server; a step 1304 of analyzing the DNS query to detect an indication of a content originator server (80) or an indication of a content delivery provider (54); a step 1306 of checking the indication against a list of domain names handled by the DNS interceptor module; a step 1308 of generating a DNS reply with an IP address of a content server (64) associated with the radio network controller (66) and not with an IP address of a content delivery provider (54) outside the mobile telecommunication network (52); and a step 1310 of sending the DNS reply to the mobile terminal (62).

Figure 14:
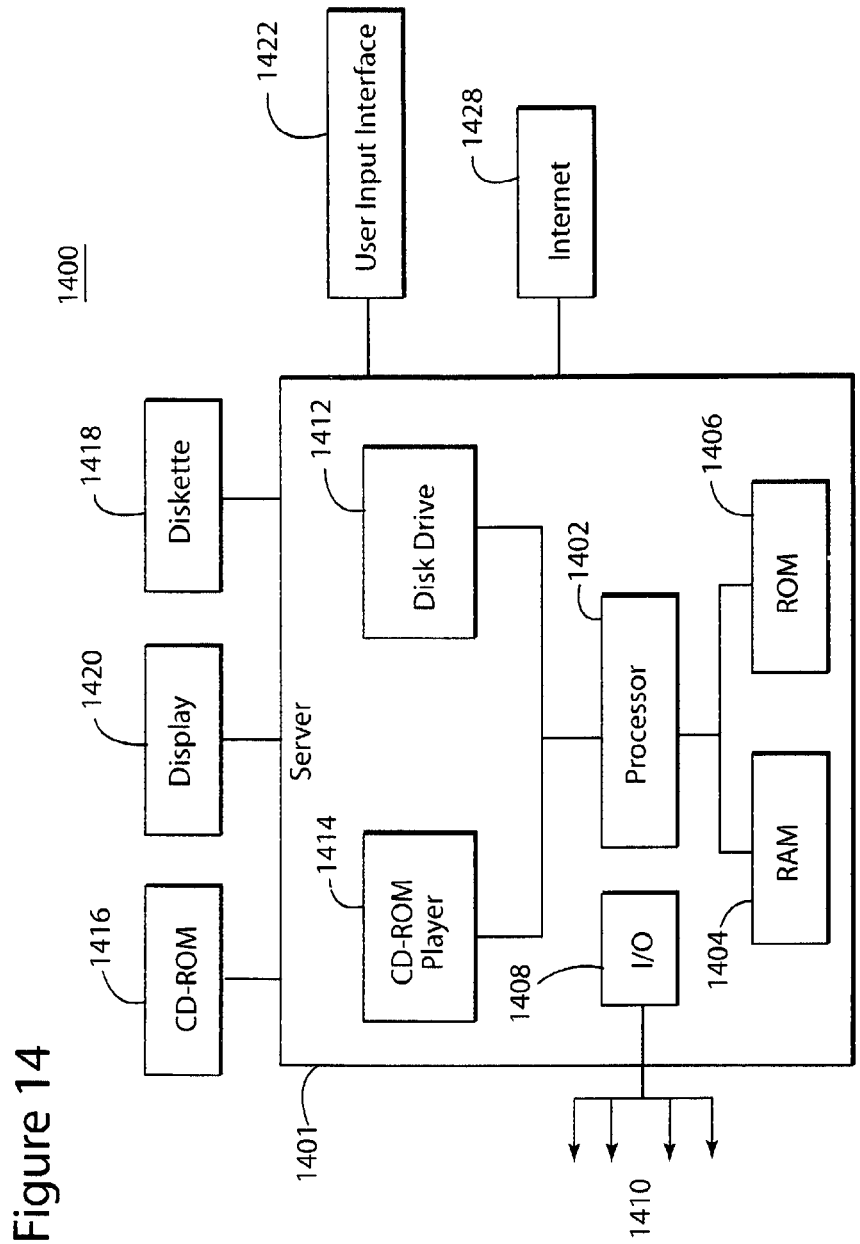
FIG. 14 is a schematic diagram of a module.

An example of a representative module capable of carrying out operations in accordance with the servers of the exemplary embodiments is illustrated in FIG. 14. Hardware, firmware, software or a combination thereof may be used to perform the various steps and operations described herein. The module 1400 of FIG. 14 is an exemplary computing structure that may be used in connection with such a system.

The exemplary module 1400 suitable for performing the activities described in the exemplary embodiments may include a server 1401. Such a server 1401 may include a central processor (CPU) 1402 coupled to a random access memory (RAM) 1404 and to a read-only memory (ROM) 1406. The ROM 1406 may also be other types of storage media to store programs, such as programmable ROM (PROM), erasable PROM (EPROM), etc. The processor 1402 may communicate with other internal and external components through input/output (I/O) circuitry 1408 and bussing 1410, to provide control signals and the like. The processor 1402 carries out a variety of functions as is known in the art, as dictated by software and/or firmware instructions.

The server 1401 may also include one or more data storage devices, including hard and floppy disk drives 1412, CD-ROM drives 1414, and other hardware capable of reading and/or storing information such as DVD, etc. In one embodiment, software for carrying out the above discussed steps may be stored and distributed on a CD-ROM 1416, diskette 1418 or other form of media capable of portably storing information. These storage media may be inserted into, and read by, devices such as the CD-ROM drive 1414, the disk drive 1412, etc. The server 1401 may be coupled to a display 1420, which may be any type of known display or presentation screen, such as LCD displays, plasma display, cathode ray tubes (CRT), etc. A user input interface 1422 is provided, including one or more user interface mechanisms such as a mouse, keyboard, microphone, touch pad, touch screen, voice-recognition system, etc.

The server 1401 may be coupled to other computing devices, such as the landline and/or wireless terminals via a network. The server may be part of a larger network configuration as in a global area network (GAN) such as the Internet 1428, which allows ultimate connection to the various landline and/or mobile client/watcher devices.

The disclosed exemplary embodiments provide a system, a method and a computer program product for DNS redirection in a mobile telecommunication network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A radio network controller of a mobile telecommunication network, the radio network controller comprising:
    an interface configured to receive a DNS query from a mobile terminal, wherein the DNS query includes an indication of a content originator server or a content delivery provider, the content originator server and the content delivery provider being located above a GGSN;
    a domain name system, DNS, interceptor module connected to the interface and configured to associate domain names with corresponding internet protocol, IP, addresses, the DNS interceptor module being configured to intercept the DNS query from the mobile terminal, detect the indication of the content originator server or the content delivery provider, check the indication against a list of domain names handled by the radio network controller, and generate a DNS reply in response to the DNS query, the DNS reply including an IP address of a content server associated with the radio network controller, located below the GGSN, and including content from the content originator server, and not including an IP address of the content delivery provider; and
    the interface is configured to send the DNS reply to the mobile terminal,
    wherein the DNS interceptor module is configured to send the DNS query of the mobile terminal to a local DNS server if the indication of the content originator server or the content delivery provider is not found in the list of domain names handled by the radio network controller, further wherein the DNS reply by the local DNS server includes an IP address of the content delivery provider.

2. The radio network controller of claim 1, wherein the DNS interceptor module is configured to not send the DNS query of the mobile terminal to another DNS server if the indication of the content originator server or the content delivery provider is found in the list of domain names handled by the radio network controller.

3. The radio network controller of claim 1, wherein the indication of the content delivery provider includes a name of the content delivery provider and the indication of the content originator server includes a name of the content originator server.

4. The radio network controller of claim 1, wherein the content originator server is an entity that generates the content desired by the mobile terminal and the content delivery provider is another entity that distributes the content generated by the content originator server.

5. The radio network controller of claim 1, further comprising:
    a break-out module configured to extract information from tunneled traffic passing through the radio network controller.

6. The radio network controller of claim 5, further comprising:
    a filter module connected to the break-out module and configured to determine if the information is a DNS query.

7. The radio network controller of claim 6, wherein the filter module is configured to direct a web request from the mobile terminal to the content server.

8. The radio network controller of claim 6, further comprising:
    a modifier module connected to the filter module and configured to modify a destination IP address of the DNS query to an IP address of the DNS interceptor module and send the modified DNS query to the DNS interceptor module.

9. The radio network controller of claim 8, wherein the DNS interceptor module is configured to send the DNS query back to the modifier module when there is no content server at the radio network controller level to provide the desired content.

10. The radio network controller of claim 1, wherein the DNS interceptor module comprises a DNS interceptor function running on a processor.

11. The radio network controller of claim 10, wherein the DNS interceptor function is configured to not send the DNS query of the mobile terminal to another DNS server if the indication of the content originator server or the content delivery provider is found in the list of domain names handled by the radio network controller.

12. The radio network controller of claim 10, further comprising:
    a break-out function configured to extract information from tunneled traffic passing through the radio network controller.

13. The radio network controller of claim 12, further comprising:
a filter function configured to determine if the information is a DNS query.

14. The radio network controller of claim 13, wherein the filter function is configured to direct a request from the mobile terminal to the content server.

15. The radio network controller of claim 13, further comprising:
a modifier function configured to modify a destination IP address of the DNS query to an IP address of the DNS interceptor function.

16. The radio network controller of claim 15, wherein the DNS interceptor function is configured to send the DNS query back to the modifier function when there is no content server at the radio network controller level to provide the desired content.

17. A method for enabling domain name system, DNS, resolution in a mobile telecommunication network, the method comprising:
receiving, at a radio network controller of the mobile telecommunication network, a DNS query from a mobile terminal;
instead of forwarding the DNS query to a DNS server, intercepting the DNS query at a DNS interceptor module;
analyzing the DNS query to detect an indication of a content originator server or an indication of a content delivery provider, the content originator server and the content delivery provider being located above a GGSN;
checking the indication against a list of domain names handled by the DNS interceptor module;
generating a DNS reply including an IP address of a content server associated with the radio network controller, located below the GGSN, and including content from the content originator server, and not an IP address of the content delivery provider outside the mobile telecommunication network; and
sending the DNS reply to the mobile terminal,
wherein the DNS interceptor module is configured to send the DNS query of the mobile terminal to a local DNS server if the indication of the content originator server or the content delivery provider is not found in the list of domain names handled by the radio network controller, further wherein the DNS reply by the local DNS server includes an IP address of the content delivery provider.

18. The method of claim 17, further comprising:
changing a source IP address of the DNS reply to an IP address of a local DNS server when the indication of the content originator server or the content delivery provider is found in the list of domain names handled by the radio network controller.

19. The method of claim 17, wherein the indication of the content delivery provider includes a name of the content delivery provider and the indication of the content originator server includes a name of the content originator server.

20. The method of claim 17, wherein the content originator server is an entity that generates the content desired by the mobile terminal and the content delivery provider is another entity that distributes the content generated by the content originator server.

21. The method of claim 17, further comprising:
extracting with a break-out module information from tunneled traffic passing through the radio network controller.

22. The method of claim 21, further comprising:
determining in a filter module if the information is a DNS query.

23. The method of claim 22, further comprising:
directing a request from the mobile terminal to the content server in the filter module.

24. The method of claim 22, further comprising:
modifying a source IP address of the DNS reply in a modifier module connected to the filter module to an IP address of a local DNS.

25. The method of claim 24, further comprising:
sending the DNS query back to the modifier module when there is no content server at the radio network controller level to provide the desired content.

26. The method of claim 17, further comprising:
repeating all the steps at a new radio network controller when the mobile terminal moves from the original radio network controller to the new radio network controller.

* * * * *

UNITED STATES PATENT AND TRADEMARK OFFICE
CERTIFICATE OF CORRECTION

PATENT NO. : 8,937,908 B2  Page 1 of 1
APPLICATION NO. : 13/883104
DATED : January 20, 2015
INVENTOR(S) : Damola et al.

It is certified that error appears in the above-identified patent and that said Letters Patent is hereby corrected as shown below:

In the drawings

In Fig. 8, Sheet 6 of 12, for Tag "70", in Line 1, delete "xya.com" and insert -- xyz.com --, therefor.

In Fig. 13, Sheet 11 of 12, for Tag "1308", in Line 3, delete "outside outside" and insert -- outside --, therefor.

In the specification

In Column 2, Line 42, delete "40." and insert -- 38. --, therefor.

Signed and Sealed this
Twentieth Day of October, 2015

Michelle K. Lee
*Director of the United States Patent and Trademark Office*